(12) United States Patent
Witte et al.

(10) Patent No.: US 12,479,260 B2
(45) Date of Patent: Nov. 25, 2025

(54) METHOD FOR OPERATING A DAMPER SYSTEM OF A VEHICLE

(71) Applicant: Dr. Ing. h.c. F. Porsche Aktiengesellschaft, Stuttgart (DE)

(72) Inventors: Thomas Witte, Ditzingen-Heimerdingen (DE); Jochen Liebold, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 18/630,132

(22) Filed: Apr. 9, 2024

(65) Prior Publication Data

US 2024/0416707 A1    Dec. 19, 2024

(30) Foreign Application Priority Data

Jun. 13, 2023 (DE) .......................... 102023115399.4

(51) Int. Cl.
*B60G 17/08* (2006.01)
*B60G 17/015* (2006.01)
(Continued)

(52) U.S. Cl.
CPC ......... *B60G 17/08* (2013.01); *B60G 17/0152* (2013.01); *B60G 17/0165* (2013.01);
(Continued)

(58) Field of Classification Search
CPC ............... B60G 17/08; B60G 17/0152; B60G 17/0165; B60G 17/019
See application file for complete search history.

(56) References Cited

U.S. PATENT DOCUMENTS 3,873,122 A * 3/1975 Fischer .............. B60G 17/0152
280/6.158
4,513,833 A * 4/1985 Sheldon ............. B62D 55/1125
180/9.1

(Continued)

FOREIGN PATENT DOCUMENTS

DE    112017000979 T5    12/2018
DE    102017117658 A1    2/2019
(Continued)

OTHER PUBLICATIONS

German Examination Report for German Application No. 10 2023 115 399.4 dated May 16, 2024 with English language translation. (10 pages).

*Primary Examiner* — James A Shriver, II
(74) *Attorney, Agent, or Firm* — Buchanan Ingersoll & Rooney PC

(57) ABSTRACT

A method for operating a damper system of a vehicle having an active damper and a hydraulic assembly arranged to control the damper. The hydraulic assembly includes a hydraulic pump and at least one control valve. Requirements placed upon the damper are defined with regard to the dynamics and force that are to be set. Depending on the defined requirements, the hydraulic pump of the hydraulic assembly operates at a minimum rotary speed and a defined opening setting of the at least one control valve. Based on the minimum rotary speed of the hydraulic pump and the defined opening settings of the control valve, a dynamic force setting of the damper takes place by way of a change of the opening setting of the at least one control valve. Alternatively or additionally, a high-value force setting of the damper takes place by changing the rotary speed of the pump.

19 Claims, 1 Drawing Sheet

(51) Int. Cl.
*B60G 17/0165* (2006.01)
*B60G 17/019* (2006.01)

(52) U.S. Cl.
CPC ........ *B60G 17/019* (2013.01); *B60G 2202/24* (2013.01); *B60G 2202/416* (2013.01); *B60G 2400/204* (2013.01)

(56) References Cited

U.S. PATENT DOCUMENTS

| | | | | |
|---|---|---|---|---|
| 4,647,068 | A * | 3/1987 | Asami | B60G 17/0165 280/5.517 |
| 5,097,419 | A * | 3/1992 | Lizell | B60G 17/018 188/266.5 |
| 6,206,383 | B1 * | 3/2001 | Burdock | B60G 21/067 280/5.506 |
| 2003/0057618 | A1 * | 3/2003 | Tanner | B60G 13/14 267/136 |
| 2005/0071060 | A1 * | 3/2005 | Lauwerys | F16F 9/46 701/37 |
| 2006/0287791 | A1 * | 12/2006 | Boon | B60G 21/073 701/37 |
| 2009/0166989 | A1 * | 7/2009 | Atsushi | B60G 17/08 280/5.503 |
| 2016/0059658 | A1 * | 3/2016 | Kuriki | B60G 13/14 290/1 R |
| 2017/0240017 | A1 | 8/2017 | Vandersmissen et al. | |
| 2018/0015802 | A1 * | 1/2018 | Jeong | B60G 17/019 |
| 2019/0084367 | A1 * | 3/2019 | Birch | B60G 15/06 |

FOREIGN PATENT DOCUMENTS

| | | |
|---|---|---|
| DE | 102021117081 A1 | 1/2023 |
| EP | 2890573 B1 | 8/2017 |
| EP | 3216632 A1 | 9/2017 |
| EP | 3378684 A1 | 9/2018 |

* cited by examiner

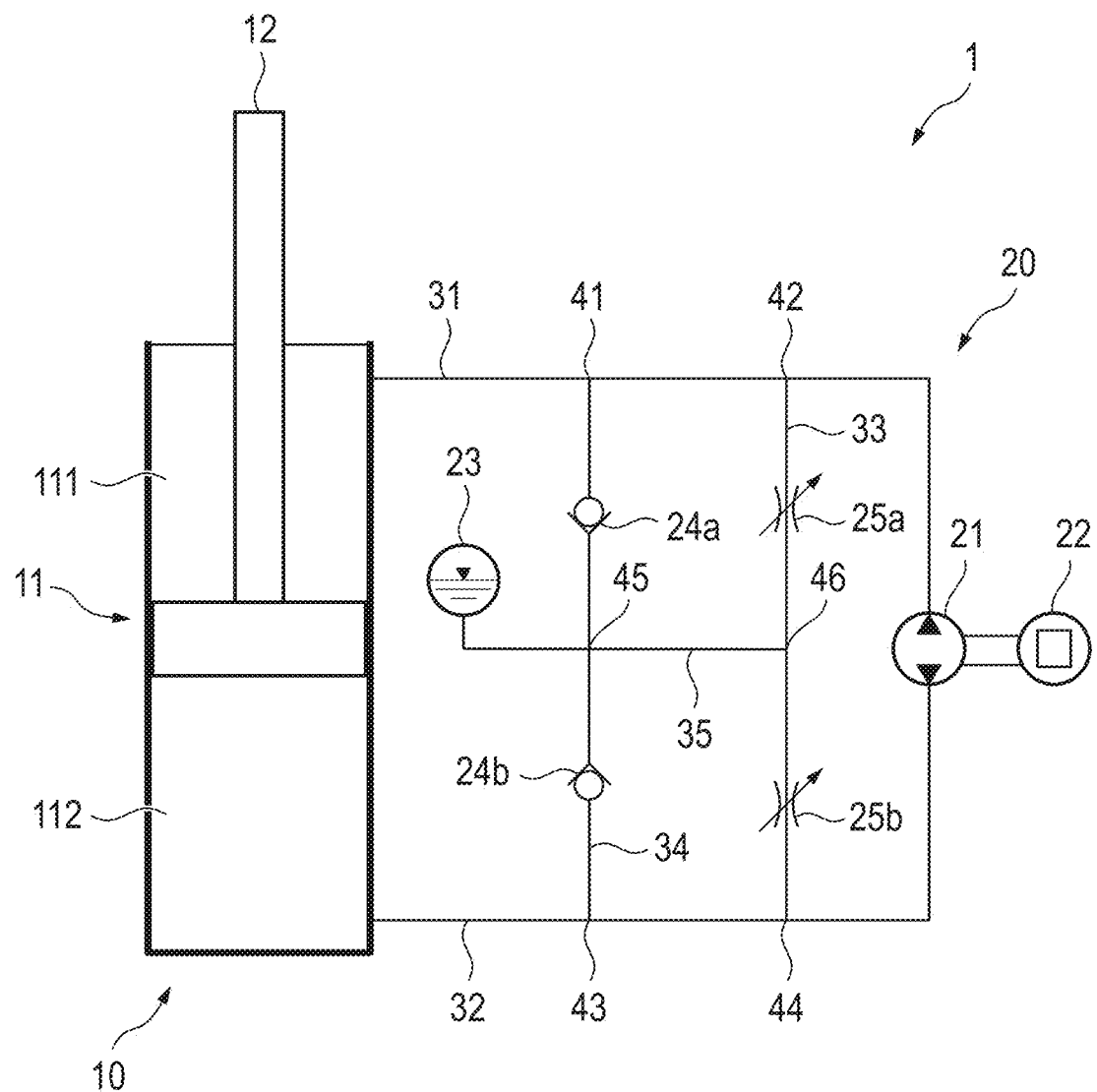

METHOD FOR OPERATING A DAMPER SYSTEM OF A VEHICLE

CROSS-REFERENCE TO RELATED APPLICATION

This application claims priority to German Patent Application No. 10 2023 115 399.4, filed Jun. 13, 2023, the content of such application being incorporated by reference herein in its entirety.

FIELD OF THE INVENTION

The invention relates to a method for operating a damper system of a vehicle with an active damper.

BACKGROUND OF THE INVENTION

In order to be able to meet the requirements in terms of ride comfort, ride safety in different driving situations, many vehicle manufacturers rely on damper systems with so-called active dampers. Such dampers can be highly dynamically adjusted to the corresponding requirements during operation in their behavior regarding the damping properties and the force to be set. To this end, a hydraulic assembly with two hydraulic chambers of the damper separated by a piston is connected, wherein the pressure in the hydraulic chambers can be changed to thereby alter the damping properties and the force provided by the damper. Typically, the hydraulic assembly for adjusting the corresponding pressures includes a hydraulic pump and two controllable valves (called control valves or damper valves). Such a hydraulic system is known, for example, from DE 10 2017 117 658 A1, which is incorporated by reference herein.

One common optimization goal in operating such systems is power consumption. For example, EP 2890573 B1, which is incorporated by reference herein, describes an active chassis that includes special energy management valves and check valves to allow for recirculation of the oil in resistive mode and thereby a lower power consumption when not in operation. The active chassis further includes a hydraulic pump with a speed regulator.

It is known from EP 3378684 A1, which is incorporated by reference herein, to control the rotary speed of a hydraulic pump such that the hydraulic pump operates at a relatively low rotary speed but still always provides a sufficient flow for actuation of the damper.

EP 3378684 A1 and EP 3216632 A1, which are each incorporated by reference herein, each describe a suspension device having a pump and a control unit which controls a drive of the pump, wherein the control unit is configured to determine a road surface condition index and determine a desired rotary speed of the pump based on the condition of the road surface. A disadvantage with an active wheel suspension for a vehicle is that the active control of the pump as well as the control valves is more energy-consuming compared with purely passive damper systems.

SUMMARY OF THE INVENTION

Against the above background, described herein is a method which allows the most energy-saving possible operation of an active damper system without having to accept a loss of ride comfort and/or ride safety.

The method according to aspects of the invention is intended for operating a damper system of a vehicle having an active damper and a hydraulic assembly arranged to control the damper, wherein the hydraulic assembly comprises a hydraulic pump and at least one control valve. According to the method according to aspects of the invention, requirements placed upon the damper are defined with regard to the dynamics and force of the damper that are to be provided. As a requirement, for example, certain minimum dynamics and/or a minimum force to be achieved by the damper can be specified or also specifications for the damper's property as a passive damper at a defined force to be set as an active damper. Depending on the defined requirements, the hydraulic pump of the hydraulic assembly is operated at a minimum rotary speed and a defined opening setting of the at least one control valve. The minimum rotary speed and the defined opening setting are thus adjusted upon changing the requirements in the travel path of the vehicle and are thus also variable in operation if requirements for a preceding path section are redefined and/or adjusted. Based upon the minimum rotary speed of the hydraulic pump and the defined opening settings of the control valve, according to aspects of the invention, a dynamic force setting of the damper takes place by a change of the opening setting of the at least one control valve. Alternatively or additionally, a high-value force setting of the damper takes place by changing the rotary speed of the hydraulic pump. In the context of the application, a dynamic force setting is understood to be defined as a changing force setting of the damper, wherein the force to be provided by the damper is less than a limit force determined based on the defined requirements. In contrast, a "high-value force setting" is understood as a force setting that exceeds the limit force determined based on the defined requirements.

By means of the method according to aspects of the invention, an operation of the damper system that is as energy-efficient as possible is enabled, wherein the requirements placed upon the damper system can nevertheless be met and thus no compromise has to be accepted with regard to the ride comfort or ride safety. Low-value but potentially highly dynamic force requirements that are set by way of the definition of the requirements placed upon the damper can be set for operation of the hydraulic pump at the specified minimum rotary speed by controlling the at least one control valve, without any delay, whereas correspondingly high-value force requirements can be set by increasing the rotary speed of the hydraulic pump. If it is assumed that when traveling along a route, the damper only has to provide high forces in an exceptional case, the rotary speed of the hydraulic pump can be operated at the specified minimum rotary speed in order to be able to provide the dynamic, i.e., changing, low-value forces required during travel. This allows the hydraulic pump to be operated as energy-efficiently as possible.

In a preferred embodiment of the method according to aspects of the invention, it is configured to operate a damper system with a hydraulic assembly, wherein the hydraulic assembly is fluidically connected to a first hydraulic chamber of the damper via a first hydraulic line and to a second hydraulic chamber of the damper via a second hydraulic line, and the first hydraulic line and the second hydraulic line are further fluidically connected via a third hydraulic line, wherein a first control valve and a second control valve are disposed in the third hydraulic line. Depending on the defined requirements, the hydraulic pump of the hydraulic arrangement is operated at a minimum rotary speed and a defined opening setting of the first control valve and/or the second control valve is set, and a dynamic force setting of the damper is performed by a change in the opening setting of the first control valve and/or the second control valve.

In an advantageous embodiment of the invention, the requirement placed upon the damper is based on the roadway condition of the route in the direction of travel in front of the vehicle and/or based on a vehicle speed. For example, roadway conditions within the scope of this application are understood to be properties of the asphalt, waves on the roadway, potholes, speed bumps or other properties of the surface of the roadway. In uneven (poor) roadway conditions, the forces to be provided by the damper increase, whereby a comparatively high minimum rotary speed of the hydraulic pump is to be set. On a flat roadway, on the other hand, with possibly smaller imperfections, the forces to be provided by the damper can be provided even at a lower rotary speed of the hydraulic pump by corresponding control of the control valves. Likewise, the forces to be applied and their dynamics increase with increasing vehicle speed, which is why they are preferably taken into account when defining the requirements placed upon the damper.

Furthermore, the roadway condition is preferably sensed by means of sensors, in particular, preferably optical sensors. In this way, the requirements based on the roadway condition can always be defined on the path section ahead of the vehicle and, in particular, changes in the roadway condition can be taken into account.

Alternatively or additionally, information regarding the roadway condition provided to the vehicle externally is preferably taken into account when defining the requirements placed upon the damper. Information provided to the vehicle externally includes any information provided from databases (e.g., a backend) or other vehicles. For example, it is conceivable to construct a database for the roadway condition of the routes of the traffic network and to take account of the data thus established in the definition and, in the travel path of the vehicle, to take into account the necessary adjustment to the requirements placed upon the damper. In this way, information to define the requirements placed upon the damper can be provided with little effort and need not be captured by complex sensor technology, which is particularly advantageous with regard to the cost and technical complexity of the vehicles.

In a further advantageous embodiment of the invention, the requirements placed upon the damper are defined as an alternative or in addition to the above-described possibilities based upon the superstructure movement of the vehicle resulting from driver input. For example, driver input is understood to be steering movement, accelerating or braking. In this way, the operation of the damper also takes into account the corresponding travel situation. In addition, driver-specific characteristics, for example the steering behavior, can be considered in advance in the operation of the damper, so as to adaptively set the damper system to the driving style of the driver.

Furthermore, one embodiment of the invention is preferred, in which the requirements placed upon the damper are defined as an alternative or in addition to the possibilities described so far based on a driver profile. The driver can, for example, estimate his driving style and store a corresponding setting of the chassis in the driver profile. Thus, an advance setting can be made by the driver, which is taken into account when defining the requirements placed upon the damper. Preferably, the driver profile adjusts to the driver's driving style during the ride, thus adapting to the driver's needs and driving style. In this way, the driver already makes an advance setting of the chassis based upon his driving style.

Alternatively or additionally, the requirements placed upon the damper are defined preferably based on a preset chassis setting. For example, the chassis setting can be used to tune the chassis into a comfort mode, a sports mode and a race mode, wherein the requirements placed upon the damper are based on the mode selected, i.e., the defined chassis setting. In this way, the driver can already make an advance setting before the start of the journey, which can be taken into account when defining the requirements placed upon the damper.

Further preferred is an embodiment of the invention in which the minimum rotary speed is determined from the defined requirements by means of a characteristic map. A frequency of the expected adjustment by the damper is preferably used as the input variables for the characteristic map. A force setting by the damper with corresponding excitation by the roadway is to be understood as the adjustment of the damper. Alternatively or additionally, an average level of the expected adjustment by the damper is used as the input variable for the characteristic map. For higher expected adjustments, the minimum rotary speed of the hydraulic pump should be selected larger, respectively, to prevent loss of force of the damper. Furthermore, a desired degree of decoupling of the superstructure from the roadway is used as an input variable for the characteristic map. Another preferred input variable of the characteristic map is the specification of power consumption of the damper system. It is conceivable, for example, if the state of charge of the vehicle battery is low and there is a relatively long remaining travel time, to switch the damper system to a type of "energy saving mode," wherein the damping characteristics and thus the ride comfort can be somewhat reduced. By means of such input variables of the characteristic map, the requirements placed on the damper can be defined by corresponding specifications, and a corresponding minimum rotary speed of the hydraulic pump and/or a defined opening setting of the control valves can be defined and adjusted.

In a further advantageous embodiment of the invention, a change in the passive damping properties of the damper at a constant force, actively adjustable by the damper, is defined as a requirement placed on the damper, and either the minimum rotary speed of the hydraulic pump (21) is increased and the opening setting of the first control valve (25a) and/or the second control valve (25b) is increased, or the minimum rotary speed of the hydraulic pump (21) is decreased, and the opening setting of the first control valve (25a) and/or the second 35 control valve (25b) is decreased. In this way, passive damping properties of the damper can be changed in the method according to aspects of the invention without changing the force that can be actively adjusted by the damper.

BRIEF DESCRIPTION OF THE DRAWINGS

Further advantages, features and details of the invention are disclosed in the following description, making reference to the accompanying drawings.

The sole figure depicts a schematic view of an exemplary damping system for a vehicle.

DETAILED DESCRIPTION OF THE INVENTION

The sole figure shows a damping system 1 with a hydraulic cylinder 11. A piston 12 is received in the hydraulic cylinder 11 and is movable up and down in the drawing plane of the figure in a reciprocating manner. The hydraulic cylinder 11 with the piston 12 represents the damper 10.

The damper 10 is, for example, part of a wheel suspension system in a vehicle (not shown). The wheel suspension system comprises, for example, a front axle with two front wheels and a rear axle with two rear wheels. Typically, at least one damper 10 is associated with each wheel.

The hydraulic cylinder 11 is configured as a double-acting hydraulic cylinder having a first hydraulic chamber 111 and a second hydraulic chamber 112. The double-acting hydraulic cylinder 3 with a hydraulic arrangement 20 forms the damping system 1.

The hydraulic assembly 20 comprises a hydraulic pump 21, configured for example as a reversing pump that can be driven by an electric motor 22. The hydraulic assembly 20 is operated with a hydraulic medium from a hydraulic reservoir 23.

The first hydraulic chamber 111 of the hydraulic cylinder 11 is connected to one side of the hydraulic pump 21 via a first hydraulic line 31. The second hydraulic chamber 112 of the hydraulic cylinder 11 is connected to the other side of the hydraulic pump 21 via a second hydraulic line 32.

A first hydraulic branch 41 and a second hydraulic branch 42 are provided in the first hydraulic line 31. A third hydraulic branch 43 and a fourth hydraulic branch 44 are provided in the second hydraulic line 32. The second branch 42 and fourth branch 44 are connected by a third hydraulic line 33. The first branch 41 and third branch 43 are connected by a fourth hydraulic line 34.

A fifth hydraulic branch 45 is provided in the fourth hydraulic line 34. A sixth hydraulic branch 46 is provided in the third hydraulic line 33. A fifth hydraulic line 35 extends from the sixth branch 46 via the fifth branch 45 to the hydraulic medium reservoir 23.

A first check valve 24a is disposed in the fourth hydraulic line 34 between the first branch 41 and the fifth branch 45. A second check valve 24b is also disposed in the fourth hydraulic line 34 between the third branch 43 and the fifth branch 45. The check valves 24a and 24b both close towards the fifth branch 45.

A first control valve 25a, also referred to as a damping valve or damping control valve, is disposed in the third hydraulic line 33 between the second branch 42 and the sixth branch 46. A second control valve 25b, also referred to as a damping valve or damping control valve, is disposed in the third hydraulic line 33 between the sixth branch 46 and the fourth branch 44.

By adjusting a pressure difference between the first hydraulic chamber 111 and the second hydraulic chamber 112, a force of the damper 10, more specifically, of the hydraulic piston 12, can be set. If the hydraulic pump 21 is operated such that a particular pressure is applied to the first hydraulic line 31, this pressure is applied in the first hydraulic chamber 111, accordingly. Further, the pressure also reaches the first control valve 25a. Depending on the opening setting of the control valve 25a, the pressure in the third hydraulic line 33 downstream of the control valve 25a is reduced by the control valve 25a. Thus, the decreased pressure is transmitted to the second hydraulic chamber 112 via the sixth branch 46, the fifth hydraulic line 35, the fifth branch 45, the fourth hydraulic line 34, the check valve 24b, the third branch 43 and finally the second hydraulic line 32. Due to the pressure differential in the two hydraulic chambers 111, 112, a force downwardly directed in the drawing plane can consequently be provided on the hydraulic piston 12. In an analogous manner, a force setting on the hydraulic piston 12 takes place in the opposite direction, wherein the hydraulic pump 21 would have to provide the pressure in the second hydraulic line 32 accordingly.

To change a force applied to the hydraulic piston 12, two different possibilities are thus available. Firstly, the pressure drop across the first control valve 25a can be changed, and secondly, the rotary speed and thus the flow rate of the hydraulic pump 21.

By way of the method according to aspects of the invention, a possibility for the operation of the hydraulic arrangement 20 and thus of the damper system 1 that is as energy efficient as possible is provided. In this context, firstly a requirement is placed on the damper regarding the level of forces to be provided by the damper 10 as well as the dynamics to be provided by the force. The dynamics describe a rate of change of the force, i.e., how quickly the force must be changed.

The definition of the requirement is preferably made depending on various factors. The factors are, in particular, the roadway condition, the vehicle speed, the vehicle weight and advance settings regarding chassis tuning, and can be either acquired by the vehicle itself through appropriate sensing, provided by off-board sources such as other vehicles or databases, or can be defined by the driver. These factors are reflected in various possible input variables to define the demand on the damper 10. These are, for example, the frequency of the expected adjustment, i.e., the force setting, by way of the damper 10, the average level or degree of the adjustments, the required speed of the adjustments or input variables, which are predetermined by a predetermined operation, for example an energy-saving operation at the expense of ride comfort or a sports operation. In particular, the vehicle weight is also taken into account as an input variable. Preferably, a minimum rotary speed for operating the hydraulic pump 21 is determined based on the input variables using a characteristic map. The minimum rotary speed is selected such that based on the pressure provided, the damper 10 is able to adjust highly dynamic force requirements up to a particular amount of the force. This adjustment takes place by way of the control valves 25a, 25b. The regulation of the control valves 25a, 25b can be undertaken significantly faster and more energy efficiently than the change in the rotary speed of the hydraulic pump 21.

If a large amount of force is to be provided by the damper 10, this cannot be done solely by closing the corresponding control valve 25a or 25b, because in this case the flow rate in the corresponding control valve 25a decreases and the force on the damper 10 then threatens to drop. Thus, the rotary speed of the hydraulic pump 21 is increased. This must be done in time to bring the rotary speed to the required level in time to ensure a continuous flow rate through the control valve 25a, 25b and to be able to set the force. In this case, a brief departure from the minimum rotary speed is conceivable for individual force spikes that are to be provided, or an increase of the minimum rotary speed if the requirements placed on the damper system have changed, for example, due to changed roadway conditions.

The minimum rotary speed of the hydraulic pump 21 is thus variable. For example, an optical sensor can sense the road conditions in front of the vehicle and so set a low minimum rotary speed that corresponds to current road conditions. If, however, the sensor recognizes worse roadway conditions after passing through the previously evaluated section of the route, for example in the form of imperfections for the next section of the route, it can be calculated, depending on the imperfections, what force must be set when passing over the imperfections, and the minimum rotary speed can be adjusted accordingly in a timely manner. In this way, a minimum possible rotary speed and thus a minimum possible power consumption for the optimal functioning of the damper system 1 can always be ensured.

However, as already indicated above, other requirements for determining the minimum rotary speed can be included. For example, if operation with lower energy expenditure is more prioritized than operation with an optimal functioning of the damper system 1, the minimum rotary speed can be adjusted accordingly.

It is also conceivable that a passive damping effect of the damper 10 should be reduced at a constant actively adjustable force, for example, if the isolation of a wheel of the vehicle is to be increased. For this purpose, preferably in the method according to aspects of the invention, the rotary speed of the hydraulic pump 21 is increased and the opening setting of the corresponding control valve 25a, 25b is simultaneously increased. Overall, the active force of the damper 10 remains constant, however, the hydraulic resistance of the hydraulic medium from one hydraulic chamber 111, 112 to the other is reduced. Thus, the passive damping is lower, and the active force remains the same. The same applies analogously to the increase in the passive damping, wherein the rotary speed and the opening setting are reduced.

As an alternative to the embodiment of a damper system 1 shown in the figure, the method according to aspects of the invention is also applicable to further embodiments of damping systems. For example, the method can be performed on a damping system having a hydraulic pump and a control valve. The hydraulic pump is connected directly to the two hydraulic chambers of the damper via hydraulic lines and can thus manipulate the pressure in one or the other hydraulic chamber depending on the direction of action. Therein the control valve which is capable of performing the exchange of the hydraulic fluid between the hydraulic chambers is provided in the piston which separates the two hydraulic chambers from one another. The method according to aspects of the invention can thus implement a dynamic force setting based on the regulation of the control valve and a high force setting based on the regulation of the pump rotary speed, analogously to the embodiment shown in the figure.

What is claimed is:

1. A method for operating a damper system of a vehicle having an active damper and a hydraulic assembly arranged to control the damper, which hydraulic assembly includes a hydraulic pump and at least one control valve, wherein the method comprises:
    defining requirements placed upon the damper with regard to dynamics and/or force to be set based on a sensed roadway condition of a route in front of the vehicle in a direction of travel,
    defining a minimum rotary speed of the hydraulic pump based on the defined requirements, the defined minimum rotary speed corresponding to the sensed roadway condition;
    operating the hydraulic pump at the defined minimum rotary speed;
    determining a limit force at which the damper can respond to the sensed roadway condition without requiring an adjustment from the defined minimum rotary speed of the hydraulic pump;
    defining an opening of the at least one control valve depending on the defined requirements, the defined opening corresponding to the sensed roadway condition;
    setting the defined opening of the at least one control valve;
    when a force to be provided by the damper due to changing roadway conditions is less than the limit force, the method comprises changing the defined opening setting of the at least one control valve without adjusting the defined minimum rotary speed, resulting in a dynamic force setting of the damper being set; and
    when the force to be provided by the damper due to changing roadway conditions is greater than the limit force, the method comprises changing the defined minimum rotary speed of the hydraulic pump, thereby resulting in a high-value force setting of the damper being set.

2. The method according to claim 1, wherein the hydraulic pump is fluidically connected to a first hydraulic chamber of the damper via a first hydraulic line and to a second hydraulic chamber of the damper via a second hydraulic line, wherein the first hydraulic line and the second hydraulic line are further fluidically connected via a third hydraulic line, and the at least one control valve of the hydraulic assembly comprises a first control valve and a second control valve that are arranged in the third hydraulic line, said method comprising:
    changing the defined opening setting of the first control valve and/or of the second control valve, resulting in the dynamic force setting of the damper being set.

3. The method according to claim 1, wherein defining the requirement placed upon the damper additionally takes place based on a vehicle speed.

4. The method according to claim 1, wherein the roadway condition is sensed by way of sensors or optical sensors.

5. The method according to claim 1, wherein information regarding the roadway condition provided to the vehicle externally is taken into account when defining the requirement placed upon the damper.

6. The method according to claim 1, wherein defining the requirement placed upon the damper takes place on a basis of superstructure movements of the vehicle resulting from a driver input.

7. The method according to claim 1, wherein defining the requirement placed upon the damper is based on a driving profile.

8. The method according to claim 1, wherein defining the requirement placed upon the damper is based on a chassis setting.

9. The method according to claim 1, wherein a specification of the minimum rotary speed takes place from the defined requirements placed upon the damper by way of a characteristic map.

10. The method according to claim 9, wherein a frequency of an expected adjustment by the damper and/or an average level of the adjustment by the damper and/or a degree of decoupling of a superstructure from the roadway and/or a specification of a power consumption of the damper system are employed as an input variable for the characteristic map.

11. The method according to claim 2, further comprising:
    increasing or decreasing the opening setting of the first control valve and/or the second control valve.

12. The method according to claim 1, wherein, in the dynamic force setting of the damper, setting the defined opening of the at least one control valve causes a pressure reduction in a first chamber of the active damper that is fluidly connected to the at least one control valve, and operating the hydraulic pump at said minimum rotary speed causes the pump to deliver hydraulic fluid into a second chamber of the active damper.

13. The method according to claim 12, wherein the hydraulic pump is a reversible pump, wherein a first side of the pump is fluidly connected to the second chamber of the active damper via a first hydraulic line and a second side of the pump is fluidly connected to the first chamber of the active damper via a second hydraulic line.

14. The method according to claim 13, wherein a third hydraulic line fluidly interconnects the first and second hydraulic lines, and wherein the at least one control valve is directly and fluidly connected to the third hydraulic line.

15. The method according to claim 14, wherein a fourth hydraulic line interconnects the first and second hydraulic lines, and wherein the third and fourth hydraulic lines are fluidly interconnected together by a fifth hydraulic line.

16. The method according to claim 15, further comprising a first check valve that is directly and fluidly connected to the fourth hydraulic line.

17. The method according to claim 16, wherein a second check valve is directly and fluidly connected to the fourth hydraulic line, and wherein said first and second check valves are disposed on opposite sides of an intersection point connecting the fourth and fifth hydraulic lines.

18. The method according to claim 15, wherein a hydraulic reservoir is directly and fluidly connected to the fifth hydraulic line.

19. The method according to claim 15, wherein another control valve is directly and fluidly connected to the third hydraulic line, and said at least one control valve and said another control valve are disposed on opposite sides of an intersection point connecting the third and fifth hydraulic lines.

\* \* \* \* \*